Figure 1:
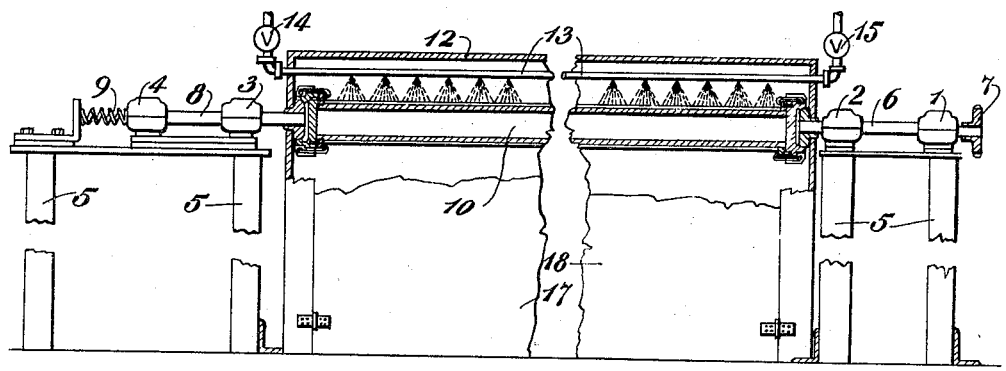

April 7, 1942.  R. T. FIELDS  2,278,858

APPARATUS FOR THE PREPARATION OF CAST RESINS

Filed Sept. 9, 1939

Reuben T. Fields INVENTOR

BY j. M. Castle jr.
ATTORNEY

Patented Apr. 7, 1942

2,278,858

UNITED STATES PATENT OFFICE 2,278,858

APPARATUS FOR THE PREPARATION OF CAST RESINS

Reuben T. Fields, Arlington, N. J., assignor to E. I. du Pont de Nemours & Company, Wilmington, Del., a corporation of Delaware Application September 9, 1939, Serial No. 294,049

11 Claims. (Cl. 18—26)

This invention relates to an apparatus for the preparation of cast resins and, more particularly, to an apparatus adapted for use in the production of tubing of cast synthetic resin.

The present application is a continuation in part of applicant's copending application Serial No. 106,251, filed October 17, 1936, entitled "Cast resins and preparation of same." Application Serial No. 106,251 is directed to a process of casting tubing of synthetic resin. This process comprises partially filling a cylindrical mold with a polymerizable organic compound in liquid form, sealing the said mold to form a gas-tight chamber, rotating the said mold about its axis in horizontal position while maintaining the said polymerizable compound at an elevated temperature sufficient to cause polymerization but substantially below the temperature of bubble formation, until the said polymerizable compound is converted to a solid, then cooling the said mold and its contents and sliding the tube thus formed from the said mold.

The successful conduct of this process on a commercial scale imposes certain requirements upon the apparatus used, and it is the general object of the present invention to provide an apparatus which meets these requirements. These are that the mold be accurately positioned and held so as to be adapted to be rotated in horizontal position about its axis, that the mold be adapted to be closed at its ends in such manner that neither the polymerizable liquid nor the vapors thereof can escape from the mold during the process of polymerization, but that, on the other hand, the necessary closures can be readily removed from one or both ends of the mold in order that the mold may be emptied and reloaded, that, in view of the longitudinal shrinkage to which the material is subject in the course of its polymerization, the interior surfaces of the mold and closures shall offer no crevices or projections which would anchor the resin and, by thus interfering with its free shrinkage, cause local fracture of the tube of resin, and that the mold with its closures in position be readily mounted in equipment for effecting rotation, and readily dismounted therefrom.

With further reference to the first named of these requirements, it is to be noted that the term "axis" is used herein, in its standard geometrical meaning, to designate that line about which a cylindrical figure is symmetrical. It is essential to the full success of the process of the parent specification, i. e., to the production of geometrically perfect tubing, that the mold be accurately centered so as to rotate truly about its axis, and it has been found difficult to meet this requirement while providing at the same time the other necessary features of the equipment.

While the several requirements may separately be fulfilled with comparatively little difficulty, it is an important object of the present invention to provide equipment which fulfills all of them in simple and reliable manner.

In accordance with the present invention these objects are accomplished by an apparatus comprising a mold tube and, at each end thereof, a sealing head therefor, means for positioning and holding said mold in contact with said sealing head, a recess in the face of said head, a gasket adapted to fit into said recess and to form therein a tight seal between said sealing head and said mold, a horizontally mounted and rotatable shaft and means for positioning and holding in fixed relationship thereto the assembly of sealing head and mold, whereby the said mold is adapted to be rotated about its axis in a horizontal plane. It is preferred that the recess and gasket be of annular shape, in register with the end of the mold tube, and that a thin sheet of inert material be interposed between the gasket and the end of the mold. It is preferred also that the sealing head be shaped to a tapered bearing surface adapted to engage a tapered bearing surface constituting a part of the shaft assembly, the engagement of these bearing surfaces serving to position and support the mold assembly.

Figure 2:
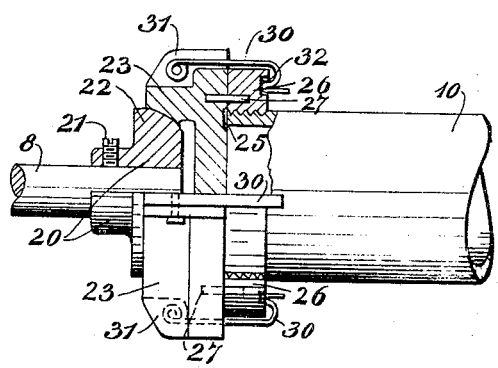

The invention will be more particularly described with reference to the accompanying drawing wherein:

Fig. 1 is a front elevation of an apparatus according to a preferred embodiment of the invention, portions being shown in section and portions being broken away for purposes of illustration; and Fig. 2 is an enlarged view, partly in section, of the assembly used for mounting the mold tube shown in Fig. 1.

Referring to Figs. 1 and 2, the bearings 1, 2, 3, and 4 are mounted on suitable supports 5 and aligned horizontally and parallel. Passing through the bearings 1 and 2 is the drive shaft 6 equipped with pulley wheel 7 adapted to be driven by a belt or the like. A similar shaft 8 is carried by the bearings 3 and 4, this shaft 8 being slidably mounted and abutting against the spring device 9. The shafts 6 and 8 are provided with means hereinafter described in detail, which means hold the cylindrical mold 10 securely and rotate this mold 10 through the drive shaft 6.

A housing, generally indicated by the reference numeral 12, encloses the mold 10 and the adjacent portions of the shafts 6 and 8. Passing through the housing 12 is a perforated pipe 13 connected with supplies of hot and cold water and equipped with valves 14 and 15. By means of the pipe 13 and the valves 14 and 15 a spray of hot or cold water may be sprayed upon the mold 10 as desired. The housing 12 is equipped with hinged doors 17 and 18 adapted to be opened to permit installation or removal of the mold 10.

The present invention has to do particularly with the mounting of the mold tube 10, which is preferably a seamless drawn aluminum tube, between the shafts 6 and 8. It will be understood upon reference to Fig. 1 that the construction illustrated in Fig. 2 for one end of the mold, and so described herein, is ordinarily duplicated at the other end, except that a second spring device is not required.

On the shaft 8 is mounted a collar 20 which is held in position by means of set screw 21. This collar 20 is provided with an external tapering surface, indicated at 22, against which tightly fits the sealing head 23, having an internal tapering surface adapted to encircle and bear upon the tapering surface of the collar 20. As there is no considerable rotational stress upon the sealing head 23, the frictional mounting on the collar 20 is adequate to prevent slippage.

The sealing head 23 is provided with an annular groove in its face, in register with the adjacent end of the mold 10, and this groove is adapted to receive the annular gasket 25, of resilient material, against which abuts the end of the cylindrical mold 10. The gasket is of such thickness that when the mold 10 is drawn up tightly against the sealing head 23 the gasket serves to seal this junction against the escape of either liquid or gas under the moderate gas pressure which is produced by the heating of the contents of the sealed mold. To this end, the gasket is of thickness substantially greater than the depth of the groove which receives it and is thus firmly compressed when the abutting metal faces are drawn together. Thus the groove may be 0.115 inch deep and the gasket 0.125 inch thick.

The mold 10 is provided, at its end, with an external thread upon which is tightly screwed the internally threaded ring 26. The ring 26 carries projecting pins 27, preferably four in number, which are received by holes bored in the sealing head 23. The pins 27 and the holes in the head 23 are carefully positioned so that when the mold is in the position fixed by the pins and holes it is exactly centered with respect to the shaft 8. Likewise, the accurate machining of the faces of the sealing head 23 and the mold 10 and ring 26 ensures the parallelism of the mold 10 and the shaft 8. Thus the mold and the shaft have a common axis, which, as already stated, lies in a horizontal plane.

As shown in Fig. 2, the ring 26 fits flush against the sealing head 23. It is held in this position by means of four spring clips 30, pivotally mounted upon the ears 31 of the sealing head 23; the clips 30 snap over the ring 26 into the annular groove 32 cut in the ring 26. The compressive effect of these spring clips in holding firmly together the abutting surfaces of the sealing head 23, the mold 10 and the ring 26, is supplemented by the thrust of a spring device 9 (Fig. 1), so that the mold 10 is accurately held by these means without any tendency to strain the spring clips 30.

In operation, the cylindrical mold 10 together with the associated sealing heads is removed from the housing by moving the shaft 8 laterally. One of the sealing heads is removed, and the mold is then partially filled with a polymerizable liquid. The sealing head is replaced on the mold 10 and the assembly of mold and sealing heads is again mounted on the collars carried by shafts 6 and 8. The mold is then rotated by a belt acting on the pulley wheel 7 and the polymerizable liquid is heated as desired by spraying hot water from the pipe 13. After the polymerizable liquid has been converted into a solid tubular body, cold water can be sprayed through the pipe 13 upon the mold to cause the tube to shrink slightly. The mold 10 together with the sealing heads is then again removed from the housing 12, one or both of the sealing heads is released and detached by a pull on the ears 31, and the tubing of polymerized resin is readily slipped out of the mold 10.

The embodiment of the invention thus described comprises the elements previously enumerated. The functions of these, their interrelationships, and alternative methods of design and construction which are to be regarded as equivalents of those set forth in the embodiment just described, will now be discussed.

The mold tube, exemplified by the tube 10 in the drawing, is ordinarily untapered since no taper is required for the release of the tubing cast in accordance with the process of said application Serial No. 106,251, and since untapered tubing is ordinarily preferred by the trade. The tube is preferably of metal selected for the avoidance of chemical interaction with the material to be polymerized therein. It is usually convenient and entirely satisfactory to use seamless drawn aluminum tubing but other metals are acceptable, including nickel, nickel bronze, stainless steel, chromium-plated steel, bronze, brass, "Inconel," etc. Any of these has a coefficient of thermal expansion of such magnitude, in comparison with that of the resin, as to permit of the easy withdrawal of the resin tube from the mold. The internal cross-section of the mold tube is in most cases circular, yielding a resin tube of which the circular walls are concentric. But the mold may be polygonal, or of other shape desired for a particular purpose, yielding a resin tube of which the outer wall conforms to the shape of the mold while the inner cavity of the tube is of substantially circular cross-section, concentric with the axis of rotation. Obviously, a mold of regular polygonal cross-section has an axis of symmetry in the same sense as does one of circular cross-section, and is to be rotated about this axis.

The sealing head, exemplified at 23 in the drawing, provides closure for the end of the mold and, at the same time, means through which the mold is attached to the shaft which effects its rotation.

The abutting surfaces of the sealing head and of the mold and also of the ring 26 or its equivalent, will be accurately and smoothly machined on a plane at right angles to the axis of the mold tube and the shafts 6 and 8.

The gasket 25 is of such thickness and resilience that when the parts are assembled it provides a tight seal against the moderate gas pressure developed within the mold cavity during the course of the polymerization, and thus insures the retention within the mold of all the polymerizable liquid loaded therein. The gasket is preferably made of a material, such as certain compounded rubbers, which is inert toward the contents of the mold, but this requirement may be relaxed if, during the assembly of the parts, there is interposed between the gasket 25 and the mold 10 a thin sheet of inert material such as "Cellophane," aluminum or tin.

The gasket 25 is shown in the drawing as a ring fitting into an annular groove which is preferred to a disc fitting into a corresponding recess in the sealing head, although the latter is operative. There are two reasons for this preference. The solvent power of many of the polymerizable liquids upon gasket materials is so nearly universal that it is ordinarily desirable to prevent contact of the polymerizable liquid with the bare gasket. This may be readily accomplished, as already stated, by interposing between the gasket and the end of the mold tube 10 a sheet of thin inert material such as "Cellophane." It has been found that when this is done with a gasket in the form of a disc the swelling of the gasket material in the center, where it is not restrained, as a result of the compression of its periphery together with expansion due to temperature, is sometimes sufficient to burst the thin protective layer of "Cellophane" or metal foil. A further reason for preferring the annular gasket, seated in an annular groove, is that the lateral support given to the gasket by the inner wall of the groove promotes the tightness of the seal.

Ordinarily, then, the gasket 25 takes the form of a circular ring of outside diameter slightly greater and of inside diameter slightly less than that of the circular interior of the mold tube 10, and thus lies in register with the end of the mold tube. If the interior of the mold tube 10 is of other than circular cross-section, the gasket is modified as may be necessary to achieve the necessary register therewith, either by being made relatively wide, so that its outer diameter is slightly greater than the maximum inside diameter of the tube, and its inner diameter slightly less than the minimum inside diameter of the tube, or by being changed from its ordinarily circular shape to conform to the non-circular shape of the interior of the tube 10. The groove which holds the gasket is, of course, cut to correspond with the shape and dimensions of the gasket.

In the embodiment of the invention illustrated in the drawing, means for positioning the mold tube in contact with the sealing head takes the form of a ring 26 threaded over the end of the mold tube 10 and a system of pins 27 projecting therefrom and received by holes bored in the sealing head 23. Other means equivalent to this for positioning the mold, i. e., insuring its alignment and centering, would include, for example, a suitable accurately machined rabbeted joint.

In the embodiment of the invention illustrated in the drawing, means for holding the mold, thus positioned, in contact with the sealing head takes the form of the system of spring clips 30 together with the spring device 9, which thrusts the mold firmly against the sealing head. This method of construction is advantageous in that it makes very simple the operation of opening and closing the mold. But obviously other means may be regarded as mechanically equivalent thereto, such as the use of a clamped ring drawn up over tapered shoulders cut upon the mold side of the ring 26 and the shaft side of the sealing head 23, or a plurality of screws or bolts or wing nuts adapted to attach the mold firmly to the sealing head.

It will be evident that in the interior of the mold and closure as illustrated and described there will exist no crevice or obstruction which will serve to anchor the material undergoing polymerization and thereby to interfere with the natural longitudinal shrinkage of the tube of synthetic resin.

The method of effecting mechanical connection between the sealing head and the shaft 8, involving a frictional bearing surface between the sealing head 23 and the collar 22 rigidly affixed to the shaft, and the thrust of the spring device 9 promotes ease of mounting and dismounting the mold with its closures in position. To mount the closed mold it is necessary merely to retract the shaft 8 against the compression of the spring device 9, thereby retracting the collar 22 enough so that the mold assembly may be inserted between the collar 22 and the corresponding collar at the other end, and then to release the spring device. The thrust of the latter pushes the collar 22 into position against the sealing head 23 and the tapered bearing surface common to these members ensures the centering and alignment of the mold.

This two-part construction is, however, not essential, and the sealing head itself may be constructed so as to fit directly over the end of the shaft 8 and thereby to be positioned and held in proper fixed relationship to the shaft so that the shaft and mold are co-axial.

In the embodiment of the invention illustrated in the drawing, the ears 31 forming a part of the sealing head 23 are of assistance in opening the mold. The mold with its closures is removed from its mounting between the shafts and the spring clips 30 are released. A pull applied to these shoulders then suffices to open the mold, in which a partial vacuum will have been developed by the shrinkage of the resinous material in the course of its polymerization and by the chilling of the mold and contents. Lugs or ears in other forms, or a shoulder projecting continuously around the periphery of the sealing head, or a shoulder formed by cutting a groove in the periphery, will similarly serve as a shoulder for the application of the thrust or pull necessary to open the mold.

It will be understood that the advantages of the invention may in large part be gained through the use of the construction in accordance with the invention at one end only of the mold, and that it lies, accordingly, within the scope of the invention to provide such construction at one end of the mold and to close, position and hold the other end of the mold by means consistent with the requirements of the process of said application Serial No. 106,251.

The present invention provides simple equipment for the proper operation of the process of the parent case. It provides a tightly sealed tube mold, the interior of which, in contact with the material undergoing polymerization, offers no crevice or projection to interfere with the lateral shrinkage of the material, and no opportunity for chemical contamination. The mold is readily closed and opened, and readily mounted and dismounted. Construction in accordance with the invention ensures the accuracy of the positioning of the mold, with respect to the rotating mechanism, so that it is rotated, as required by the process, about its axis of symmetry in a horizontal plane.

As many apparently widely different embodiments of this invention may be made without departing from the spirit and scope thereof, it is to be understood that the invention is not limited to the specific embodiments thereof except as defined in the appended claims.

I claim:

1. In an apparatus for the preparation of tubing of cast synthetic resin and comprising a mold tube and means for supporting said mold tube in horizontal position and rotating same about its axis, the combination of a mold tube, a ring mounted externally on one end of said mold tube with one face flush with said end of said mold tube and at right angles to the axis thereof and the opposite face provided with an annular groove, a sealing head bearing against said end of said mold tube, and a plurality of spring clips mounted on said sealing head and snapped into said annular groove in said ring to hold said sealing head tight against said end of said mold tube.

2. In an apparatus for the preparation of tubing of cast synthetic resin and comprising a mold tube and means for supporting said mold tube in horizontal position and rotating same about its axis, the combination of a mold tube, a ring mounted externally on one end of said mold tube with one face flush with said end of said mold tube and at right angles to the axis thereof and the opposite face provided with an annular grove, a sealing head provided with an annular groove in one face thereof registering with said end of said mold tube, an annular gasket in said groove in said sealing head, and a plurality of spring clips mounted on said sealing head and snapped into said annular groove in said ring to hold said sealing head tight against said end of said mold tube.

3. In an apparatus as recited in claim 2, a thin sheet of inert material interposed between said sealing head and said end of said mold tube.

4. In an apparatus for the preparation of tubing of cast synthetic resin and comprising a mold tube and means for supporting said mold tube in horizontal position and rotating same about its axis, the combination of a mold tube, a ring mounted externally on one end of said mold tube, a plurality of pins mounted in said ring and extending beyond said end of said mold tube and parallel to the axis thereof, a sealing head provided with an annular groove in one face thereof registering with said end of said mold tube, and provided with holes registering with said pins carried by said ring whereby said sealing head is positively positioned with respect to said end of said mold tube, an annular gasket in said groove in said sealing head, and means for holding said sealing head tight against said end of said mold tube.

5. In an apparatus as recited in claim 4, a thin sheet of inert material interposed between said sealing head and said end of said mold tube.

6. In an apparatus for the preparation of tubing of cast synthetic resin and comprising a mold tube and means for supporting said mold tube in horizontal position and rotating same about its axis, the combination of a mold tube, a ring mounted externally on one end of said mold tube with one face flush with said end of said mold tube and at right angles to the axis thereof and the opposite face provided with an annular groove, a plurality of pins mounted in said first face of said ring and extending parallel to the axis of said mold tube, a sealing head bearing against said end of said mold tube and said ring, said sealing head being provided with holes registering with said pins carried by said ring whereby said sealing head is positively positioned with respect to said end of said mold tube, and a plurality of spring clips mounted on said sealing head and snapped into said annular groove in said ring to hold said sealing head tight against said end of said mold tube.

7. In an apparatus for the preparation of tubing of cast synthetic resin and comprising a mold tube and means for supporting said mold tube in horizontal position and rotating same about its axis, the combination of a mold tube, a ring mounted externally on one end of said mold tube with one face flush with said end of said mold tube and at right angles to the axis thereof and the opposite face provided with an annular groove, a plurality of pins mounted in said first face of said ring and extending parallel to the axis of said mold tube, a sealing head provided with an annular groove in one face thereof registering with said end of said mold tube, and provided with holes registering with said pins carried by said ring whereby said sealing head is positively positioned with respect to said end of said mold tube, an annular gasket in said groove in said sealing head, and a plurality of spring clips mounted on said sealing head and snapped into said annular groove in said ring to hold said sealing head tight against said end of said mold tube.

8. In an apparatus as recited in claim 7, a thin sheet of inert material interposed between said sealing head and said end of said mold tube.

9. In an apparatus for the preparation of tubing of cast synthetic resin and comprising a mold tube and means for supporting said mold tube in horizontal position and rotating same about its axis, the combination of a mold tube, a sealing head, means for positioning and holding said sealing head with one face tight against one end of said mold tube, the opposite face of said sealing head being provided with a tapered bearing surface concentric with respect to the axis of said mold tube when said sealing head is held in position against said end of said mold tube, a horizontally and rotatably mounted shaft, a collar fixed on said shaft and having a tapered bearing surface concentric with respect to the axis of said shaft and engaging said tapered bearing surface of said sealing head, and spring means exerting a thrust axially upon said shaft whereby said bearing surface of said collar and said sealing head are brought into engagement.

10. In an apparatus for the preparation of tubing of cast synthetic resin and comprising a mold tube and means for supporting said mold tube in horizontal position and rotating same about its axis, the combination of a mold tube, a sealing head provided with an annular groove in one face thereof registering with one end of said mold tube, said groove having an inside diameter smaller than that of said mold tube, an annular gasket made of compressible resilient material and having a thickness substantially greater than the depth of said annular groove, and means for positioning and holding said sealing head with said gasket bearing against said end of said mold tube.

11. In an apparatus for the preparation of tubing of cast synthetic resin and comprising a mold tube and means for supporting said mold tube in horizontal position and rotating it about its axis, the combination of a mold tube, a ring mounted externally on one end of said mold tube with one face flush with said end of said mold tube and at right angles to the axis thereof, a sealing head provided with an annular groove in one face thereof registering with one end of said mold tube, said groove having an inside diameter smaller than that of said mold tube, an annular gasket made of compressible resilient material and having a thickness substantially greater than the depth of said annular groove, and means for positioning and holding said sealing head firmly against said face of said ring with said gasket bearing against said end of said mold tube.

REUBEN T. FIELDS.